N. W. STORER.
LOCOMOTIVE.
APPLICATION FILED OCT. 30, 1916.
1,302,098.
Patented Apr. 29, 1919.
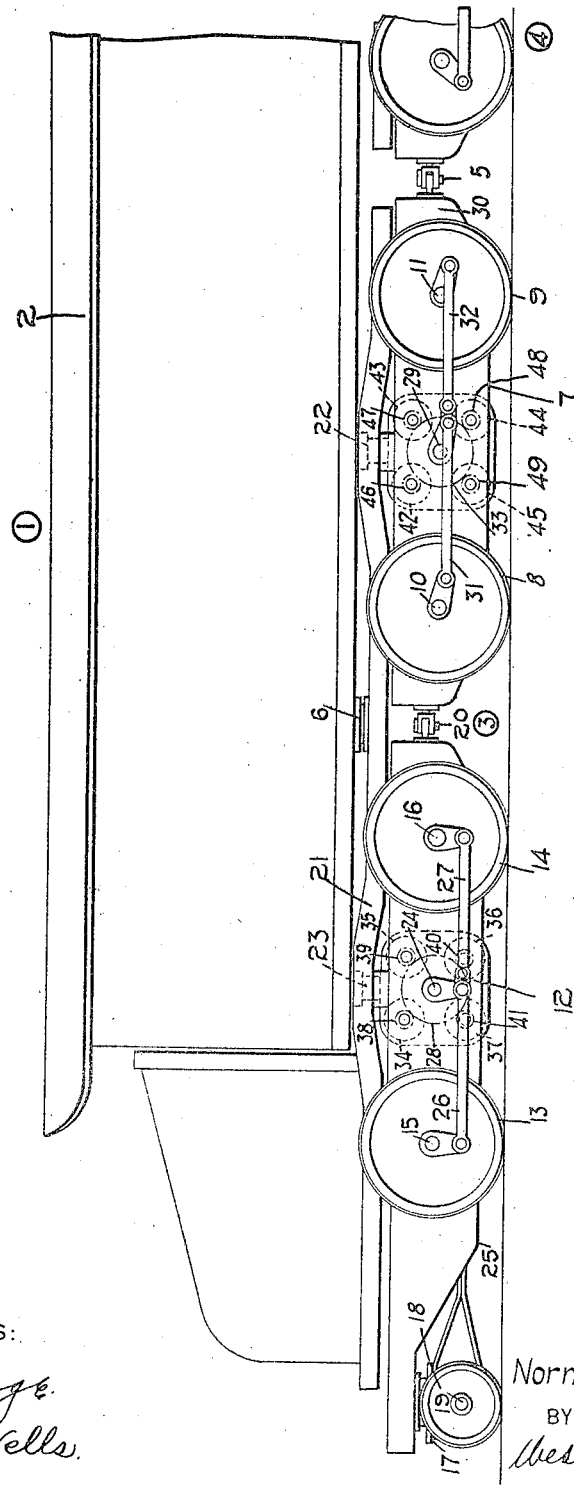
WITNESSES:
R. J. Ridge.
W. B. Wells.
INVENTOR
Norman W. Storer.
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE.

1,302,098.      Specification of Letters Patent.      Patented Apr. 29, 1919.

Application filed October 30, 1916. Serial No. 128,410.

*To all whom it may concern:*

Be it known that I, NORMAN W. STORER, a citizen of the United States, and a resident of Pittsburgh, in the county of Allegheny and State of Pennsylvania, have invented a new and useful Improvement in Locomotives, of which the following is a specification.

My invention relates to electrically propelled vehicles and particularly to electric locomotives.

One object of my invention is to provide a locomotive of the articulated type which shall be simple, strong and durable in construction, powerful and smooth-running in operation, and so constructed that it may be assembled with facility.

Another object of my invention is to provide a locomotive of the above-indicated class which shall develop a high tractive effort when the locomotive is operated at a medium speed.

More specifically, my invention embodies a locomotive having a cab provided with two articulated running gears, which are pivotally connected thereto, each of the running gears embodying two four-wheel pivotal trucks and a two-wheel radial guiding truck. Each of the pivotal trucks is provided with a jack shaft which is surrounded by four motors that are geared thereto. Side rods are provided for joining the jack shaft to the wheels of the truck associated therewith.

The single figure of the accompanying drawing is a side elevational view of a portion of a locomotive constructed in accordance with my invention.

Referring to the accompanying drawing, a locomotive 1 comprises a cab 2, and two articulated running gears 3 and 4 which are of like construction. The running gears are joined to each other by an articulated connection 5 and are joined to the cab by means of pivotal connections 6, one only of which is shown, namely, the pivotal connection of the running gear 3.

Each of the running gears 3 and 4 embodies a four-wheel pivotal truck 7 having two pairs of propelling wheels 8 and 9 which are respectively mounted on the driving axles 10 and 11, a four-wheel pivotal truck 12 having two pairs of propelling wheels 13 and 14 which are respectively mounted on the driving axles 15 and 16, and a two-wheel radial guiding truck 17 having two wheels 18 mounted on an axle 19. The two pivotal trucks 7 and 12 are connected together by means of an articulated connection 20 and are pivotally connected to an intermediate frame 21 by means of pivotal connections 22 and 23.

A jack shaft 24 is mounted in side frames 25 of the truck 12 between the two pairs of driving wheels 13 and 14 and is connected to the axles 15 and 16 of the driving wheels 13 and 14 by means of side rods 26 and 27. Gear wheels 28 are mounted on the jack shaft 24 for a purpose to be later set forth. A jack shaft 29 is mounted on the side frames 30 of the truck 7 midway between the two pairs of driving wheels 8 and 9 and is connected to the axles 10 and 11 of the driving wheels 8 and 9 by means of side rods 31 and 32. Gear wheels 33 are mounted on the jack shaft 29 for a purpose to be later described.

A motor structure, comprising motors 34, 35, 36 and 37, is mounted on the side frames 25 of the truck 12, so that the motors are symmetrically disposed around the jack shaft 24. Pinions 38, 39, 40 and 41 are mounted on the shafts of the motors 34, 35, 36 and 37 and are adapted to mesh with the gear wheels 28 which are mounted on the jack shaft 24. A similar set of motors 42, 43, 44 and 45 is mounted on the side frames 30 of the truck 7 adjacent to the jack shaft 29 and is provided with pinions 46, 47, 48 and 49 which mesh with the gear wheels 33 which are mounted on the jack shaft 29.

Variations in the structure and arrangement and location of parts may be made without departing from the spirit and scope of my invention, and such modifications are intended to be covered in the appended claims.

I claim as my invention:

1. In a locomotive, the combination with a cab, of two articulated running gears pivotally connected thereto, each of said running gears comprising two four-wheel pivotal trucks and a two-wheel guiding truck, and means located between the pairs of wheels of each of said pivotal trucks for propelling the same.

2. In a locomotive, the combination with a cab, of two articulated running gears pivotally connected thereto, each of said running gears comprising two four-wheel pivotal trucks and a two-wheel guiding truck, a jack shaft located between, and connected to, the pairs of wheels of each pivotal truck, and four motors connected to each jack shaft.

3. In a locomotive, the combination with a cab, of two articulated running gears pivotally connected thereto, each of said running gears comprising two four-wheel driving trucks, a jack shaft mounted on each truck between, and connected to, the pairs of wheels of each truck, and four motors surrounding each jack shaft and connected thereto.

4. In a locomotive, the combination with a cab, of two articulated running gears pivotally connected thereto, each of said running gears comprising two four-wheel driving trucks, a jack shaft disposed between, and connected to, the wheels of each truck, and four motors connected to each jack shaft.

5. In a locomotive, the combination with a cab and two articulated running gears pivotally joined thereto, each of said running gears comprising two four-wheel pivotal trucks and a two-wheel radial truck, of a jack shaft mounted on each of said pivotal trucks between the two pairs of wheels thereof, four motors disposed adjacent to each jack shaft and connected thereto, and side rods for joining each jack shaft to the four wheels associated therewith.

6. In a locomotive, the combination with a cab and two running gears, each comprising two four-wheel trucks, of jack shafts connected to the driving wheels of the trucks, and a plurality of motors connected to each jack shaft.

7. In a locomotive, the combination with a cab and two articulated running gears pivotally connected thereto, each of said running gears comprising two four-wheel pivotal trucks, of a jack shaft mounted on each truck between the two pairs of driving wheels and connected thereto, and a plurality of motors symmetrically disposed around and connected to each jack shaft.

8. In a locomotive, the combination with a cab, of two articulated running gears, each of said running gears comprising an intermediate frame pivotally connected to the cab, two four-wheel trucks pivotally connected to each intermediate frame, a jack shaft located between, and connected to, the driving wheels of each truck, and a plurality of motors symmetrically disposed around, and connected to, each jack shaft.

In testimony whereof, I have hereunto subscribed my name this 25th day of Oct. 1916.

NORMAN W. STORER.

Copies of this patent may be obtained for five cents each, by addressing the "Commissioner of Patents, Washington, D. C."